(12) United States Patent
Shahparnia

(10) Patent No.: US 9,377,907 B2
(45) Date of Patent: Jun. 28, 2016

(54) SELF CAPACITANCE IMPLEMENTATION METHOD

(71) Applicant: Shahrooz Shahparnia, Campbell, CA (US)

(72) Inventor: Shahrooz Shahparnia, Campbell, CA (US)

(73) Assignee: Apple Inc., Cupertino, CA (US)

( * ) Notice: Subject to any disclaimer, the term of this patent is extended or adjusted under 35 U.S.C. 154(b) by 527 days.

(21) Appl. No.: 13/624,718

(22) Filed: Sep. 21, 2012

(65) Prior Publication Data

US 2014/0085246 A1    Mar. 27, 2014

(51) Int. Cl.
*G06F 3/044*  (2006.01)
*G06F 3/041*  (2006.01)

(52) U.S. Cl.
CPC ............ *G06F 3/044* (2013.01); *G06F 3/0418* (2013.01)

(58) Field of Classification Search
CPC ............. G06F 3/0418; G06F 2203/04101; G06F 3/044; G06F 3/0416; G06F 3/0412; G06F 3/041
USPC .......... 345/173, 174; 331/177 R, 179
See application file for complete search history.

(56) References Cited

U.S. PATENT DOCUMENTS

| | | | |
|---|---|---|---|
| 4,667,146 A | 5/1987 | Addis | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,841,427 A * | 11/1998 | Teterwak | G06F 3/044 178/18.05 |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,868,875 B2 * | 1/2011 | Park | G06F 3/0421 345/104 |
| 8,446,158 B1 * | 5/2013 | Jansson | 324/686 |
| 8,479,122 B2 | 7/2013 | Hotelling et al. | |
| 2005/0278403 A1 | 12/2005 | Miller | |
| 2006/0026521 A1 | 2/2006 | Hotelling et al. | |
| 2006/0197753 A1 | 9/2006 | Hotelling | |
| 2008/0142352 A1 * | 6/2008 | Wright | 200/600 |

(Continued)

FOREIGN PATENT DOCUMENTS

| | | | |
|---|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Grant Sitta
*Assistant Examiner* — Amen Bogale
(74) *Attorney, Agent, or Firm* — Morrison & Foerster LLP

(57) ABSTRACT

A circuit for detecting a touch or proximity event on a touch input device is provided. The circuit is able to mitigate the effects that parasitic capacitance has on a self-capacitance touch sensor panel by injecting a signal into the sensing circuitry. The signal is adjusted until it calibrates the circuitry for the effects that parasitic capacitance imparts on the detection of touch or proximity events on a touch sensor panel.

25 Claims, 11 Drawing Sheets

(56) References Cited

U.S. PATENT DOCUMENTS

| | | | |
|---|---|---|---|
| 2008/0157893 A1* | 7/2008 | Krah | 331/177 R |
| 2008/0158178 A1* | 7/2008 | Hotelling | G06F 3/044 345/173 |
| 2008/0309622 A1* | 12/2008 | Krah | G06F 3/0418 345/173 |
| 2009/0153152 A1* | 6/2009 | Maharyta | G01R 27/2605 324/684 |
| 2010/0060593 A1* | 3/2010 | Krah | 345/173 |
| 2010/0060608 A1* | 3/2010 | Yousefpor | 345/174 |
| 2010/0073301 A1 | 3/2010 | Yousefpor et al. | |
| 2010/0079401 A1* | 4/2010 | Staton | 345/174 |
| 2011/0193817 A1* | 8/2011 | Byun | G06F 3/0418 345/174 |
| 2011/0242050 A1* | 10/2011 | Byun | G06F 3/044 345/174 |
| 2012/0044198 A1 | 2/2012 | Chai et al. | |
| 2012/0218222 A1* | 8/2012 | Shen | G06F 3/044 345/174 |
| 2013/0285971 A1 | 10/2013 | Elias et al. | |
| 2013/0285973 A1 | 10/2013 | Elias et al. | |
| 2014/0145997 A1 | 5/2014 | Tiruvuru | |
| 2015/0035787 A1 | 2/2015 | Shahparnia | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Sep. 10, 2015, for U.S. Appl. No. 14/067,870, filed Oct. 30, 2013, 16 pages.

* cited by examiner

SELF CAPACITANCE IMPLEMENTATION METHOD

FIELD OF THE DISCLOSURE

This relates generally to the mitigation of a parasitic capacitance on a capacitive touch sensing panel to facilitate a greater reliability in the ability of the touch sensor panel to detect touch and proximity events over a wide range of distances.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO). The lines are often arranged orthogonally on a substantially transparent substrate. Mutual capacitance touch sensor panels not only have the ability to detect touch events on the touch sensor panels, but also have the ability to detect proximity events, in which an object is not touching the panel but is in close proximity to the panel. However, mutual capacitance touch pads are constrained in their ability to sense proximity events, and thus only provide proximity detection over a limited range of distances from the touch sensor panel.

SUMMARY OF THE DISCLOSURE

This relates to a touch sensor panel configured to mitigate the effect of a parasitic capacitance on a touch sensor panel and its ability to reliably detect touch and proximity events. The panel can be configured to include circuitry that is capable of mitigating parasitic capacitance by employing an analog front end that is configured to calibrate out the effects of parasitic capacitance on a self-capacitance touch input device by injecting a charge into the sensing circuitry so that the effects of parasitic capacitance are substantially mitigated. The analog front end can settings can be configured during a calibration mode such that a signal-to-noise ratio of the touch sensor is substantially unaffected by parasitic capacitance.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a touch sensor panel which can have the ability to not only sense touch events but to also sense proximity events over a wide dynamic range of distances. The touch sensor panel hardware can be switched into various configurations depending on the range of distance that is desired to be sensed. Furthermore, the parasitic capacitance experienced by the touch sensor panel can be mitigated so that it does not act to distort the touch sensor panel's ability to detect touch and proximity events. Driven shielding can be employed to reduce parasitic capacitance, and the parasitic capacitance's effect on phase can be calibrated out to reduce its net effect on touch and proximity detection.

Although examples disclosed herein may be described and illustrated herein in terms of self-capacitance touch sensor panels, it should be understood that the examples are not so limited, but are additionally applicable to any capacitive touch sensor panel in which a wide dynamic range of detection is required. Additionally, although examples disclosed herein may be described and illustrated in terms of driven shielding being applied to one or more of a border trace area, a display area and electrodes, it should be understood that the examples are not so limited, but may be additionally applicable to any part of a touch input device which contributes parasitic capacitance to sense detection. Furthermore, although examples disclosed herein relate to a method of mitigating parasitic capacitance on a touch sensor panel, it should be understood that the examples are not so limited, but may be additionally applicable to any capacitive touch sensor device such as a capacitive trackpad.

Figure 1A:
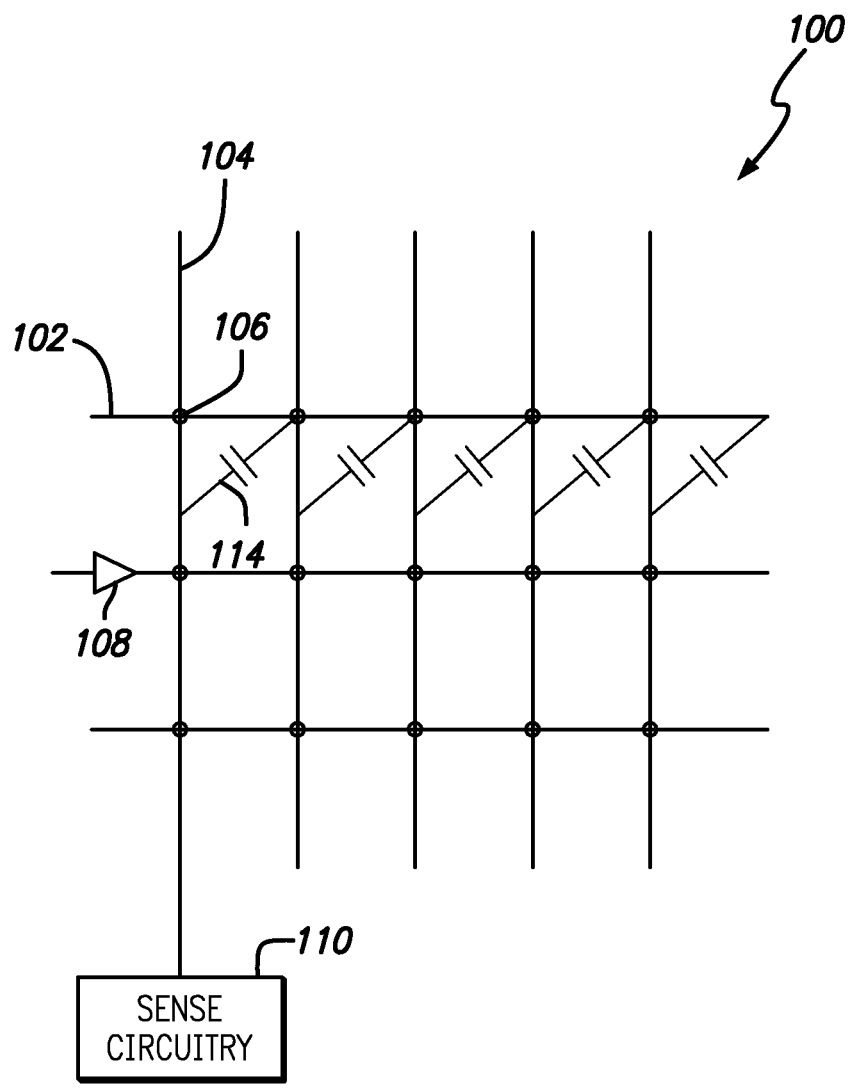
FIG. 1a illustrates an exemplary mutual capacitance touch sensor circuit according to one disclosed example.

FIG. 1a illustrates an exemplary touch sensor panel 100 according to some examples of the disclosure. Touch sensor panel 100 can include an array of touch nodes 106 that can be formed by a two-layer electrode structure separated by a dielectric material, although in other examples the electrodes can be formed on the same layer. One layer of electrodes can include a plurality of drive lines 102 positioned perpendicular to another layer of electrodes comprising a plurality of sense lines 104, with each of the nodes 106 having an associated mutual capacitance 114 (also referred to as coupling capacitance), although in other examples, the drive and sense lines can be positioned in non-orthogonal arrangements. The drive lines 102 and sense lines 104 can cross over each other in different planes separated from one another by a dielectric. Each point in which a drive line 102 intersects a sense line 104 can create a touch node 106. Thus, for example, a panel which contains for instance 20 drive lines 102 and 15 sense lines 104 will have 300 touch nodes available to detect touch or proximity events.

Drive lines 102 (also referred to as rows, row traces, or row electrodes) can be activated by a stimulation signal provided by respective drive circuits 108. Each of the drive circuits 108 can include an alternating current (AC) or unipolar pulsatile voltage source referred to as a stimulation signal source. To sense touch event(s) on the touch sensor panel 100, one or more of the drive lines 102 can be stimulated by the drive circuits 108, and the sense circuitry 110 can detect the resulting change in the charge coupled onto the sense lines 104 in the form of a change in the amplitude of the coupled stimulation signal. The change in voltage amplitude values can be indicative of a finger or conductive object touching or in proximity to the panel. The detected voltage values can be representative of node touch output values, with changes to those output values indicating the node locations 106 where the touch or proximity events occurred and the amount of touch that occurred at those location(s).

Figure 1B:
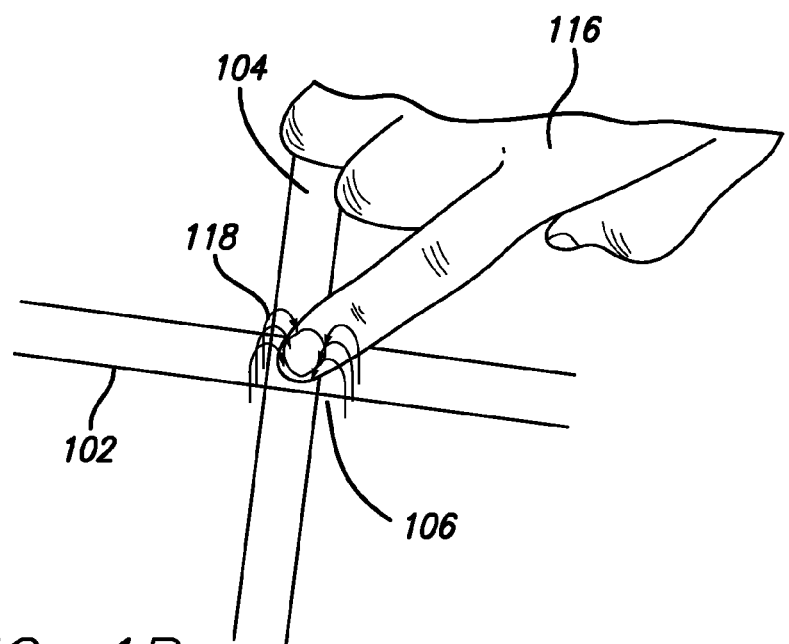
FIG. 1b illustrates an exemplary touch node and the effect that a finger touching the node has on coupled charge according to one disclosed example.

FIG. 1b illustrates an exemplary touch node and the effect that a finger touching the node can have on coupled charge according to one disclosed example. When drive line 102 is stimulated by a signal, electric field lines 118 can form between drive line 102 and sense line 104 due to the mutual capacitance between the drive and sense line, and charge can be coupled from the drive line to the sense line. When a finger or conductive object 116 comes into contact or near proximity to the touch node 106 created by the intersection of drive line 102 and sense line 104, the object can block some of the electric field lines and the amount of charge coupled between the drive and sense line can decrease, with some of the charge being coupled into the finger or object. This decrease in charge coupled onto sense line 104 from drive line 102 can be detected by sense circuitry 110.

Figure 1C:
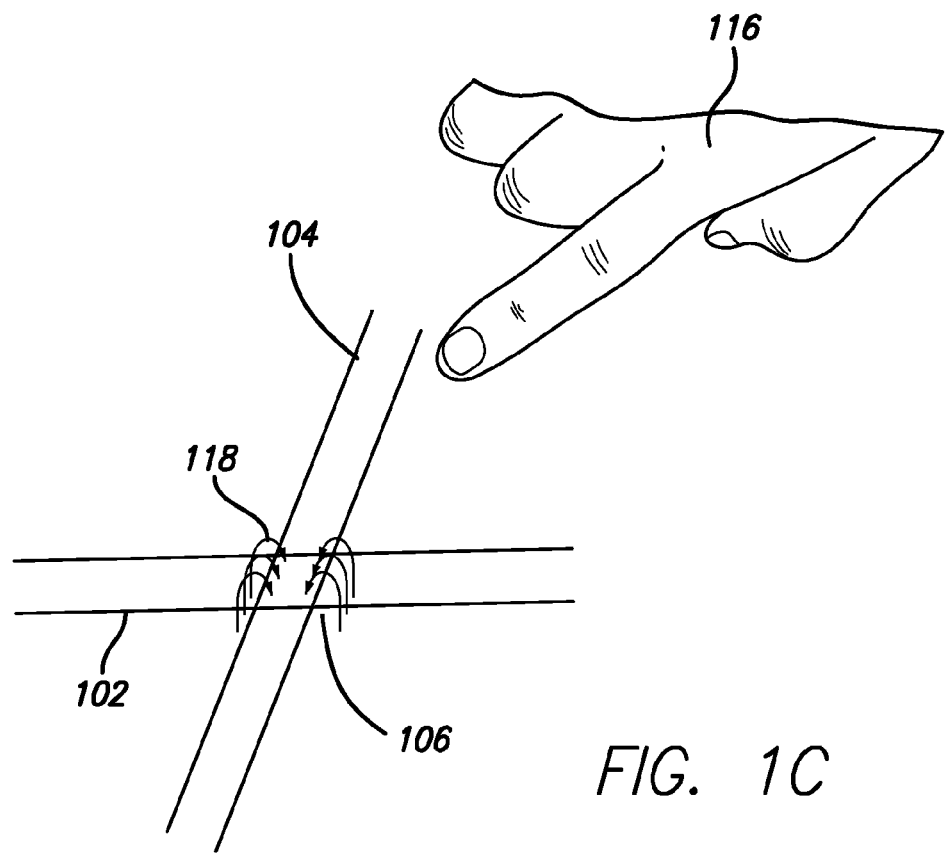
FIG. 1c illustrates another exemplary touch node and the effect that the absence of a finger has on coupled charge according to one disclosed example.

FIG. 1c illustrates an exemplary touch node and the effect that the absence of a finger can have on coupled charge according to one disclosed example. When finger 116 is removed from touch node 106, the charge emanating from drive line 102 is no longer partially coupled into finger 116 and thus the amount of charge coupled into sense line 102 can increase. Finger 116 generally can only couple charge from the drive line 102 if it is touching or in near proximity to touch node 106 and blocking some electric field lines 118. Once the finger 116 is moved away from touch node 106 and is a certain distance away from the node, then the charge is no longer coupled onto finger 116 and the touch sensor panel can no longer detect the presence of the finger and will not register a touch or proximity event. Thus, capacitive touch sensor panels which employ mutual capacitance to detect touch or proximity events often have a very limited range of distance over which the system can detect proximity events.

Figure 2:
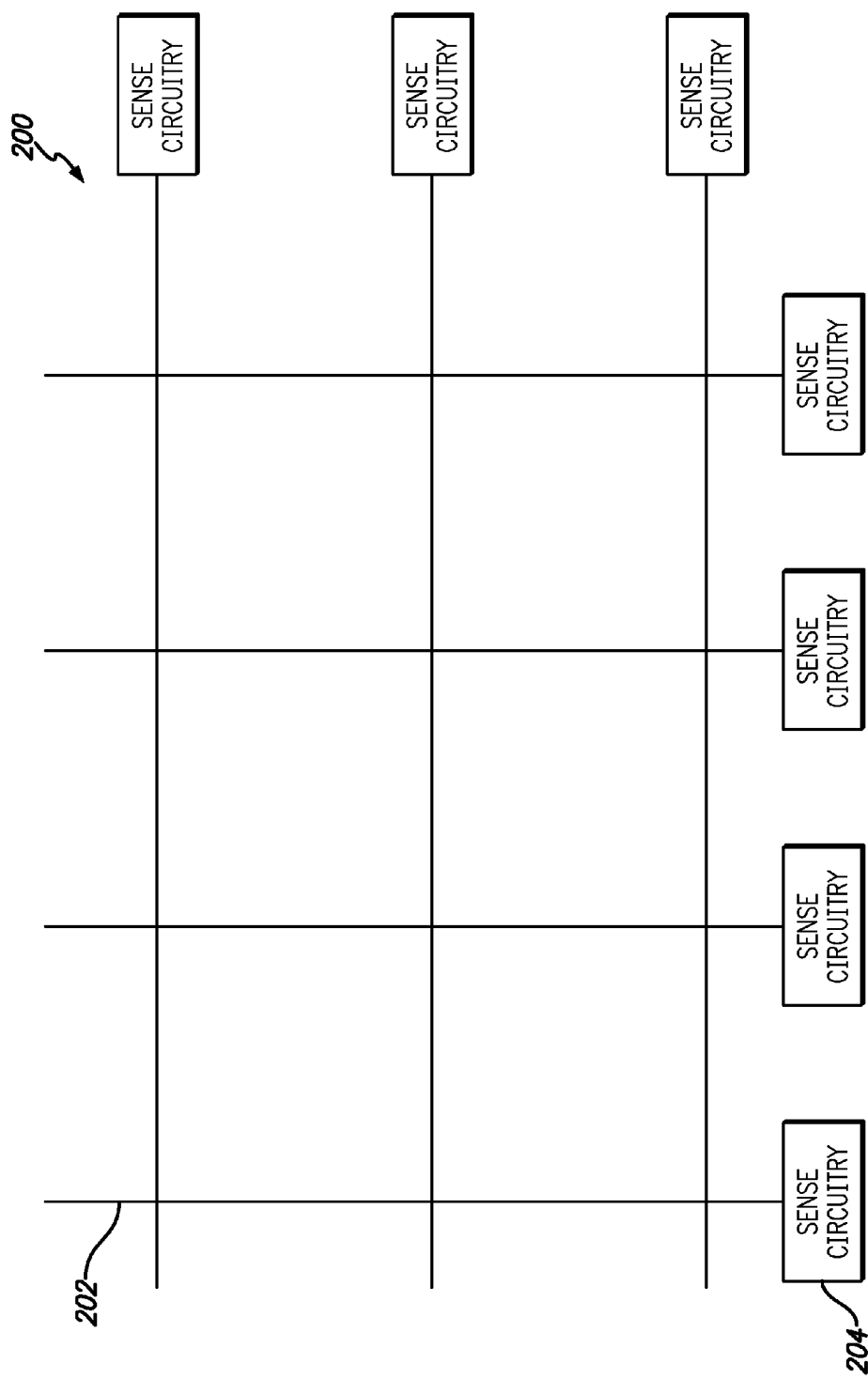
FIG. 2 illustrates an exemplary self-capacitance touch sensor circuit according to one disclosed example.

Touch sensor panels that employ self-capacitance to detect touch or proximity events can be used to detect the presence of a finger or object that is further away from the touch sensor panel than a panel which uses mutual capacitance. FIG. 2 illustrates an exemplary self-capacitance touch sensor circuit 200 according to one disclosed example. Self-capacitive touch sensor panel circuit 200 contains electrodes 202 which are connected to sense circuitry 204 and have a self-capacitance to ground. When an object touches or is in close proximity with the electrode, an additional capacitance can be formed between the electrode and ground through the object, which can increase the self-capacitance of the electrode. This change in the self-capacitance of an electrode 202 can be detected by sensing circuit 204. Changes in self-capacitance can be created when objects or fingers are further away from the touch panel, as opposed to mutual capacitance touch panels which require the finger or object to be either touching or in near proximity to panel in order to sense a touch or proximity event. Unlike mutual capacitance touch sensor 100, each electrode of the circuit acts as a touch node, rather than the intersections of orthogonal electrodes. Thus in 20×15 electrode array, there are only 35 touch nodes. One skilled in the art will recognize that such a self-capacitance architecture can possess a touch resolution that is less than the mutual capacitance touch resolution (e.g., 35 nodes vs. 300 nodes). Since the self-capacitive architecture described above has a reduced spatial resolution when compared to a mutual capacitive touch sensor, a self-capacitive touch sensor panel may not be able to detect touch or proximity event location with as much accuracy or unambiguity as a mutual capacitive touch sensor panel.

Figure 3A:
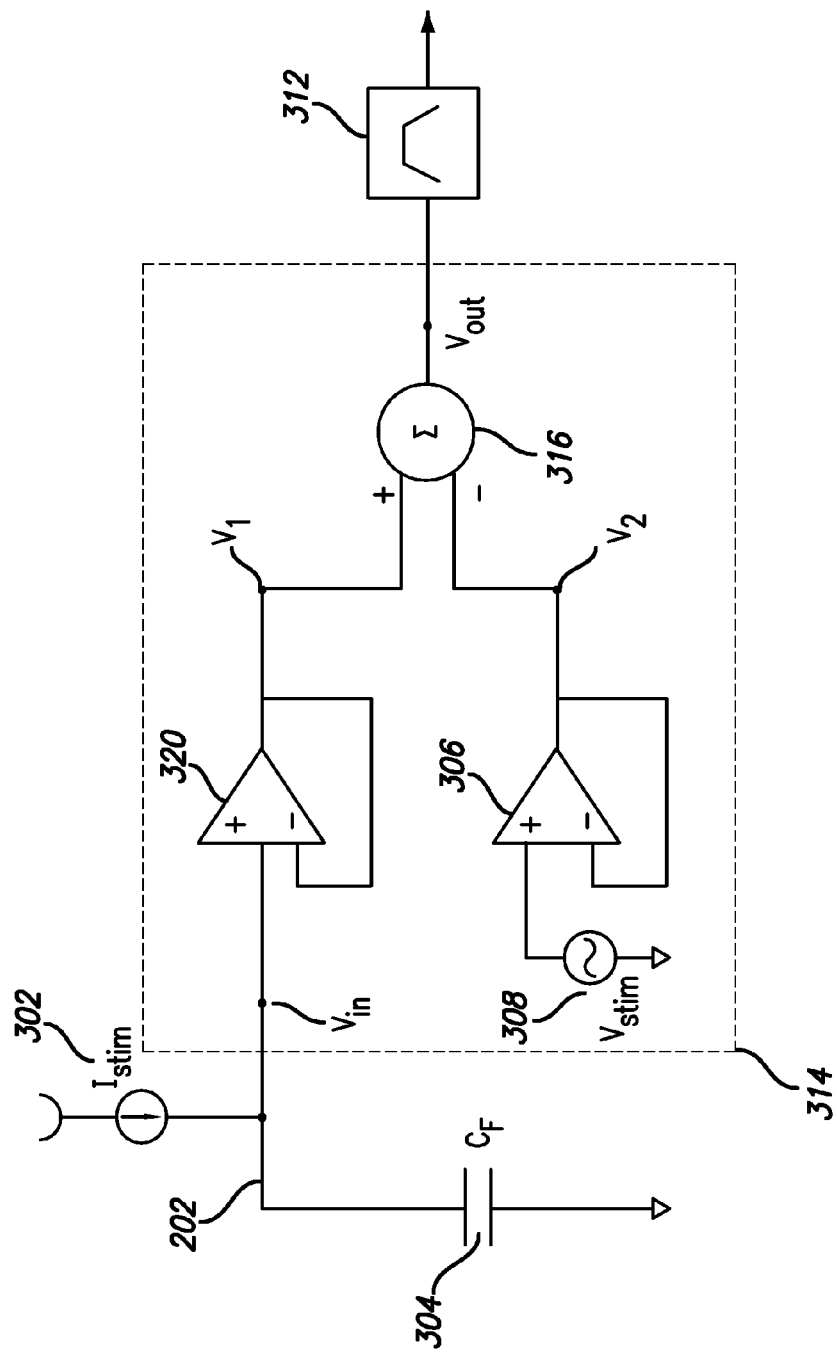
FIG. 3a illustrates an exemplary electrical circuit corresponding to a self-capacitance touch sensor electrode according to one disclosed example.

FIG. 3a illustrates an exemplary electrical circuit corresponding to a self-capacitance touch sensor electrode and sensing circuit according to one disclosed example. Electrode 202 can have a self-capacitance 304 to ground associated with it. Touch electrode 202 can be coupled to sensing circuit 314 and stimulation source 302. Stimulation source 302 can for example, be a current and voltage source and can act to provide a charge on electrode 202 for the purpose of measuring the self capacitance of the electrode. Sensing circuit 314 can include operational amplifiers 320 and 306. Operational amplifier 320 can receive Vin at its non-inverting input and can output a voltage V1. Vin can be correlated with both Istim and self-capacitance 304. Operational amplifier 306 can receive Vstim 308 at it's non-inverting input and can output a voltage V2. Both V1 and V2 can be supplied to subtractor 316 that can subtract V2 from V1 to produce Vout. Assuming a substantially stable Istim and Vstim, Vout can be correlated to the value of self-capacitance 304. Thus Vout, after passing through band pass filter 312, can be indicative of changes in self-capacitance 304. The frequency response of band pass filter 312 can depend on the frequency composition of Vstim and Istim. In some examples band pass filter 312 can be coupled to an analog to digital converter, an integrator and a demodulator. When a finger or object approaches electrode 202, the self-capacitance of the electrode 304 can change in response to the object or finger's presence. This change in self-capacitance can create a subsequent change in Vout. This change is Vout can be used to detect the change in self-capacitance caused by a touch or proximity event.

Figure 3B:
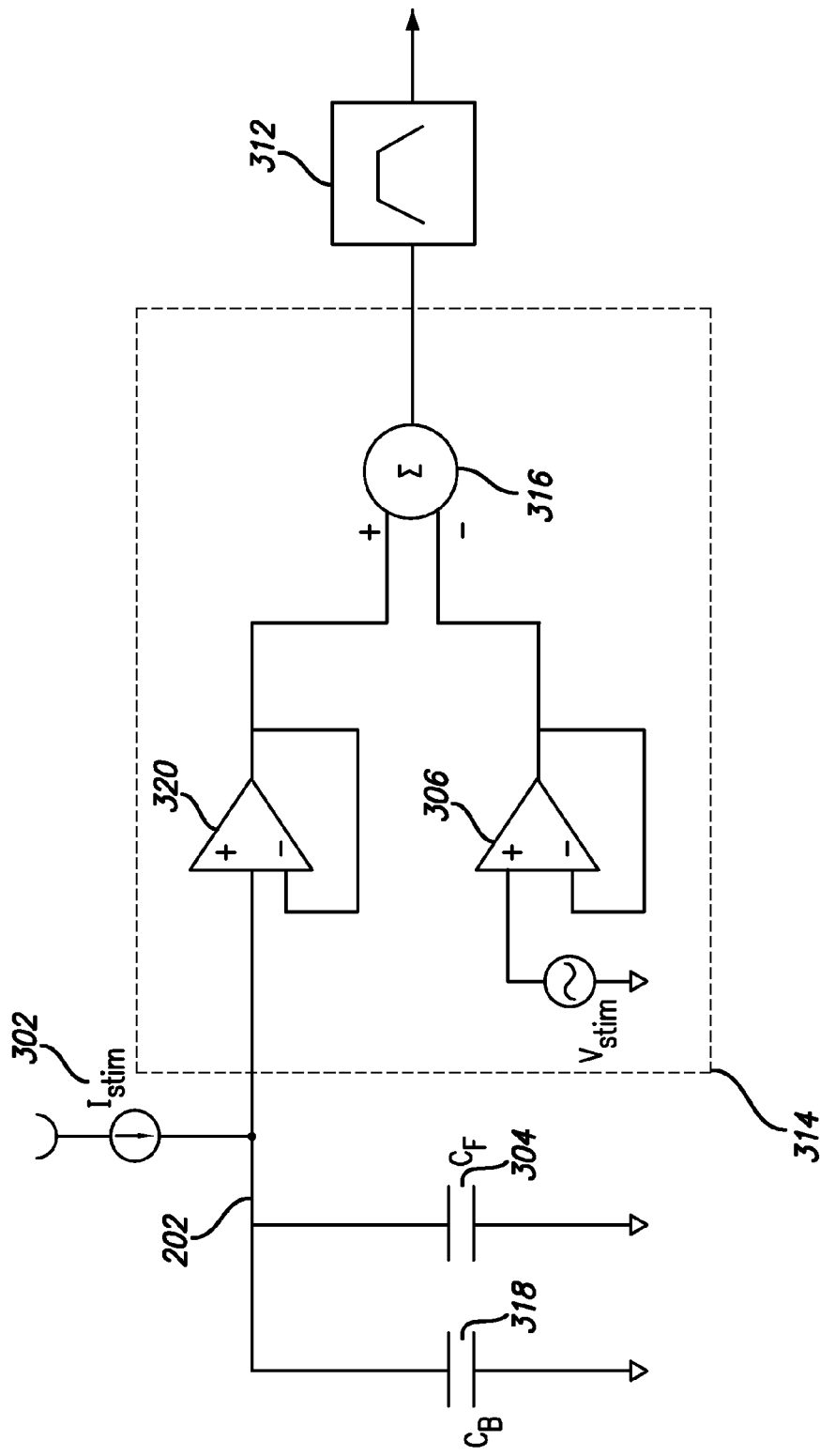
FIG. 3b illustrates an exemplary electrical circuit corresponding to a self-capacitance touch sensor electrode when a parasitic capacitance is present on the touch electrode according to one disclosed example.

FIG. 3b illustrates an exemplary electrical circuit corresponding to a self-capacitance touch sensor electrode and sensing circuit when a parasitic capacitance is present on the touch electrode according to one disclosed example. Parasitic capacitance 318 can represent capacitances found on touch electrode 202 that can be derived from various sources on a device which employs a touch sensor panel. As an example, parasitic capacitance can be created by the interaction between the touch electrodes 202 and other circuitry of the device such as a display or other conductive plates that can exist within a device which employs a touch sensor panel. One of ordinary skill in the art will recognize that in a self-capacitance touch sensing system, parasitic capacitance 318 (Cb) will be in parallel to the self-capacitance 304 (Cf) as shown in FIG. 3b. When two capacitors are in parallel they add together, thus the change in capacitance being measured by sense circuit 314 can be Cf+Cb, where Cself represents the signal of interest which is the self-capacitance of electrode 202. Since sense circuit 314 detects a combination of self-capacitance 304 and parasitic capacitance 314, the relationship between self-capacitance 304 and parasitic capacitance 318 can be important.

Figure 4A:
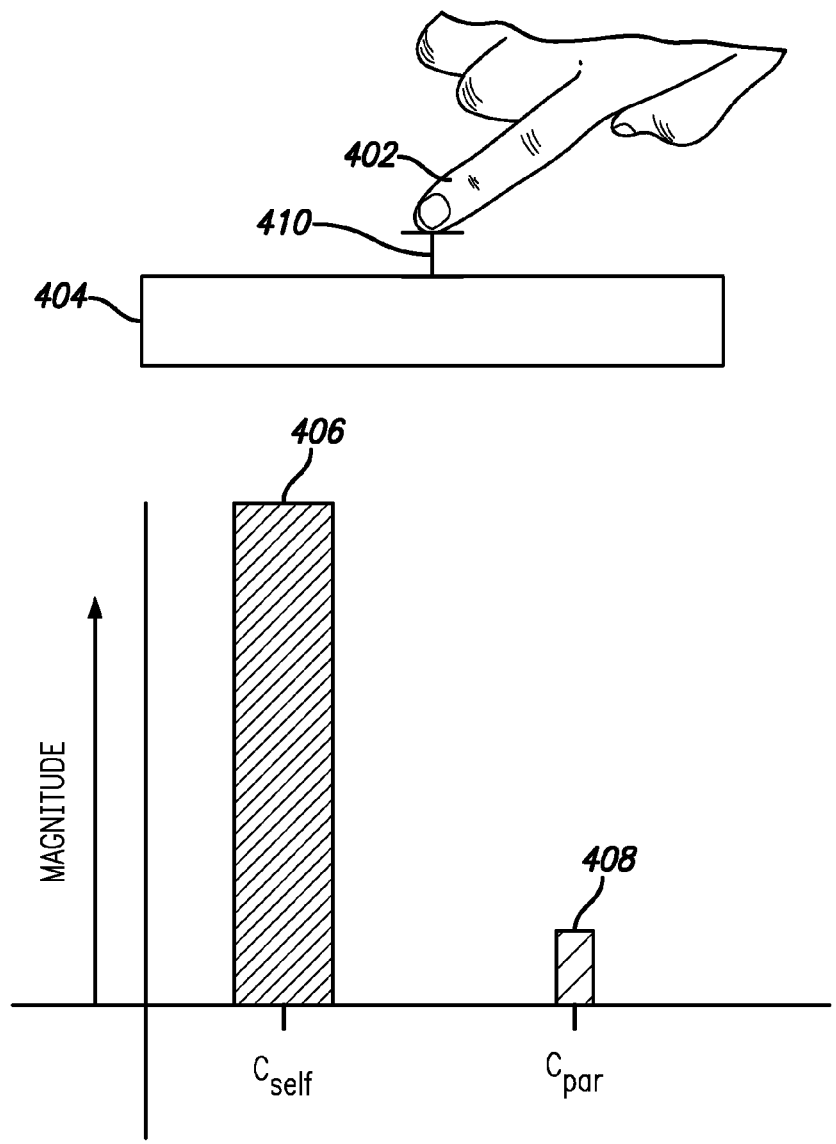
FIG. 4a illustrates an exemplary relationship between Cself and parasitic capacitance when a hand or object is near the self-capacitance touch sensor panel according to one disclosed example.

For instance, the magnitude of parasitic capacitance 314 in relation to the magnitude of self-capacitance 304 can have an effect on how accurately sense circuit 314 is able to detect changes in self-capacitance created by a finger or object in proximity to touch electrode 202. FIG. 4a illustrates an exemplary relationship between Cf and parasitic capacitance when a hand or object is near the self-capacitance touch sensor panel. As illustrated, when hand 402 is a short distance 410 from touch panel 404, the magnitude of Cf (self-capacitance) 406 is larger than the magnitude of Cb (parasitic capacitance) 408. Note that the magnitudes are illustrative and shown for purposes of relative comparison only, and are not intended to represent actual magnitudes. If Cf 406 is considered the signal of interest and Cb 408 is considered a noise source, then the touch sensor panel 404 can be said to have a good signal to noise ratio (SNR), thus making touch and proximity detection more reliable.

Figure 4B:
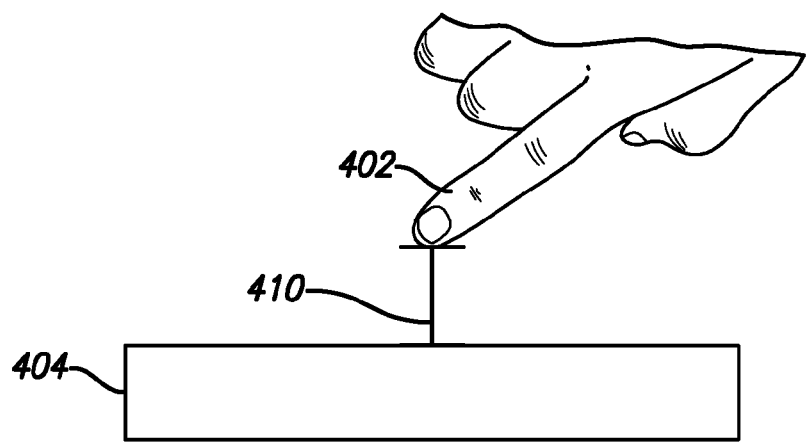
FIG. 4b illustrates an exemplary relationship between Cself and parasitic capacitance when a hand or object is far from the self-capacitance touch sensor panel.
Figure 4B:
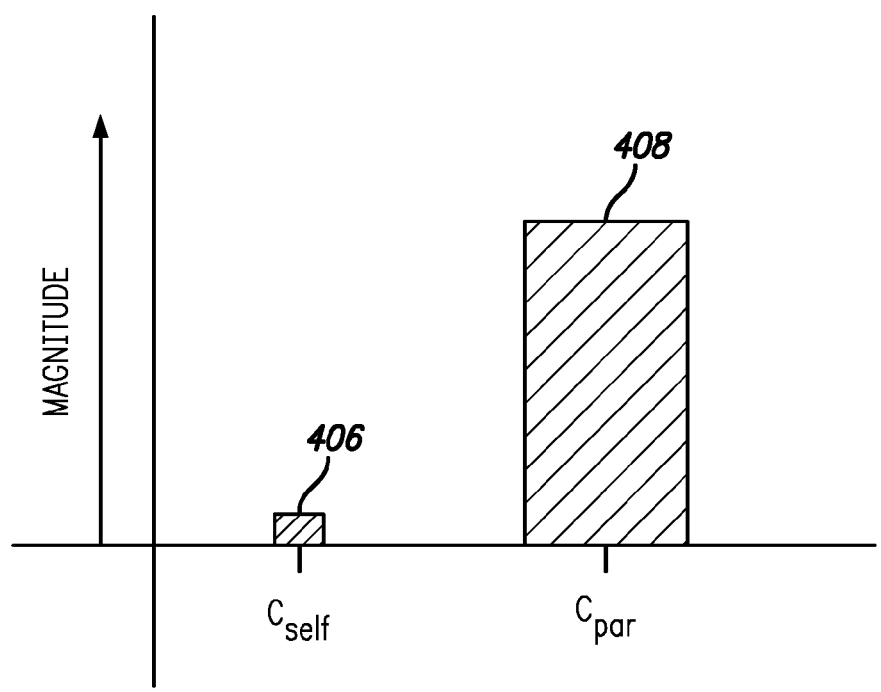

FIG. 4b illustrates an exemplary relationship between Cf and parasitic capacitance when a hand or object is far from the self-capacitance touch sensor panel. When hand 402 increases its distance 410 from touch panel 404, the magnitude of Cf 406 can become much smaller since Cf is inversely proportional to the distance that an object is located from the touch sensor panel. While fluctuations in distance 410 can cause fluctuations in the magnitude of Cf 406, Cb 408 can remain roughly constant. This means that as the hand 402 moves farther away from touch sensor panel 404, the SNR of the sensor system can decrease. Eventually, when hand 402 is a certain distance 410 from touch sensor panel 404, Cb 408 can be said to "drown out" Cf 406. In other words, the magnitude of Cb 408 can be so great as compared to the magnitude of Cf 406 that touch sense circuitry 204 may no longer be able to detect changes in Cf. For instance in the circuit of FIG. 3b, if Cb is substantially larger than Cf, any changes to Vout may be undetectable.

These relationships between Cf and Cb can mean that a self-capacitance touch sensor panel's performance over distance can be constrained by at least two factors: the distance 410 that a hand or object 402 is away from touch panel 404, and the amount of parasitic capacitance 408 present on the touch sensor panel 404. In order to achieve an acceptable SNR across a wide dynamic range of distance, parasitic capacitance's 408 effect on SNR can be reduced or eliminated so that its magnitude relative to Cf is small.

In some examples the sense circuitry used to detect changes in self-capacitance can only measure a constant total amount of charge. In such a scenario the Cb signal rather than acting as a noise source, can act as an offset signal to Cf. If the sense circuitry can only measure a constant total amount of charge, a larger Cb can mean that a smaller amount of the constant measureable charge will be allocated to Cf. Therefore a large Cb indirectly translates to a smaller signal, and hence a lower SNR. If Cb can be made smaller or appear smaller to the sense circuitry, a larger amount of the constant measureable charge can be allocated to Cf which translates to a larger signal and thus a higher SNR.

Figure 5:
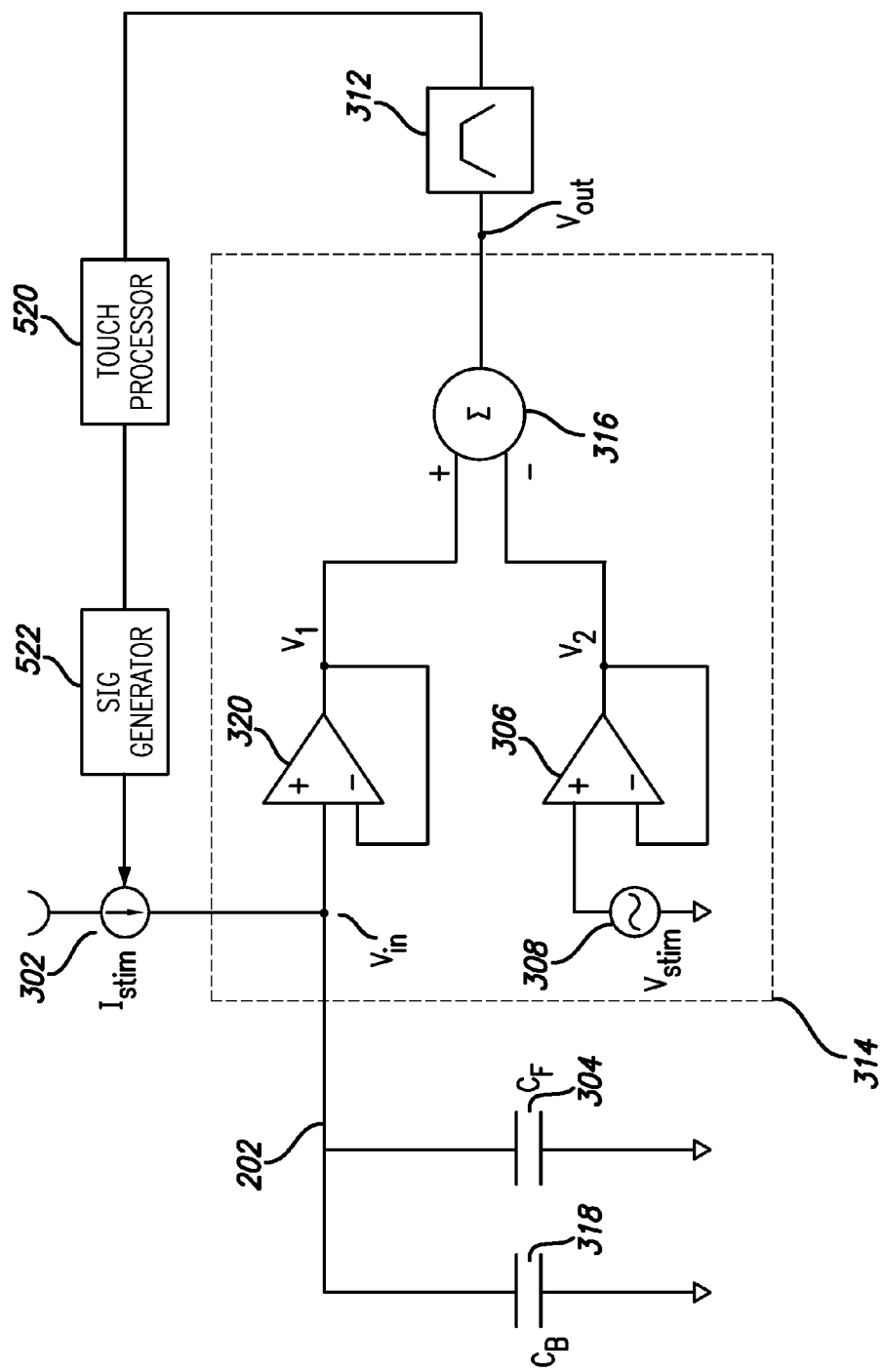
FIG. 5 illustrates a touch sense circuitry configuration that can be used to mitigate the effects of parasitic capacitance according to one example.

Thus, in order to increase the dynamic range within which proximity events can be detected, the effect that parasitic capacitance has on touch and proximity event detection can be mitigated in order to allow for errors in proximity event detection to be minimized. FIG. 5 illustrates a touch sense circuitry configuration that can be used to mitigate the effects of parasitic capacitance according to one example. In order to mitigate the effect that parasitic capacitance has on a touch sensor panel, the value of Istim can be calibrated so that the value of Vout equals zero when no touch or proximity event is occurring on the panel. During a calibration procedure, the value of Vout can be detected by touch processor 520. Touch processor 520 can include an analog to digital converter that can convert the detected Vout into a digital signal to be used by the touch processor. Touch processor 520 can detect the value of Vout during a calibration procedure, and send a signal to signal generator 522 to adjust the value of Istim. In order to mitigate the effect of parasitic capacitance on the panel, Vout can be made to equal zero or close to zero such that in the presence of a touch or proximity event, touch processor 520 can readily detect the change in Vout. In other words, by adjusting Istim such that Vout is zero, the parasitic capacitance will no longer "drown out" the self-capacitance signal, and thus a change in self-capacitance can be detected. In order to make Vout equal zero, the inputs to subtractor 316 should be equal. This means that the outputs of operational amplifiers 320 and 306 should be equal. In order to make the outputs of operational amplifiers 320 and 306 equal, the input to operational output 320, Vin, should be equal to the input of operational amplifier 306, Vstim. This relationship can be expressed mathematically as follows:

$$V_{out} = V_{in} - V_{stim} \quad (1)$$

Vstim, as an example, can be expressed as:

$$V_{stim} = A_{stim} \sin(\omega_c t + \phi_1) \quad (2)$$

In order for Vout to be equal to zero, Vin=Vstim. Vin can be expressed as:

$$V_{in} = \frac{\int I_{stim} dt}{C_b} \quad (3)$$

When Vin=Vstim, then Istim can be expressed as:

$$I_{stim} = C_b \frac{dV_{stim}}{dt} \quad (4)$$

When Istim is set to equal equation 4, then Vout becomes zero. If a finger or object is touching or in close proximity to electrode 202, Vout can become:

$$V_{out} = -C_f \frac{V_{stim}}{(C_f + C_b)}$$

Thus, as shown in equation 4, when Cf is zero, Vout can be zero. When Cf is non-zero (in other words a touch or proximity event in occurring on the panel), the value of Vout can be non-zero and proportional to the value of Cf. This is due to the fact that Cb is greater than Cf and therefore the denominator of the equation can be considered constant. During a calibration procedure, touch processor 520 can monitor Vout, and if Vout is not zero or substantially zero, touch processor 520 can command signal generator 522 to adjust the value of Istim. Once the value of Istim is set such that the value of Vout is zero when no touch or proximity event is occurring, the value of Istim can remain constant during a touch or proximity event detection mode.

The calibration procedure described above can be done at the time of manufacturing of the panel, or it can be done periodically during use of the touch sensitive device to account for changes in parasitic capacitance caused by thermal variation, for example.

Figure 6:
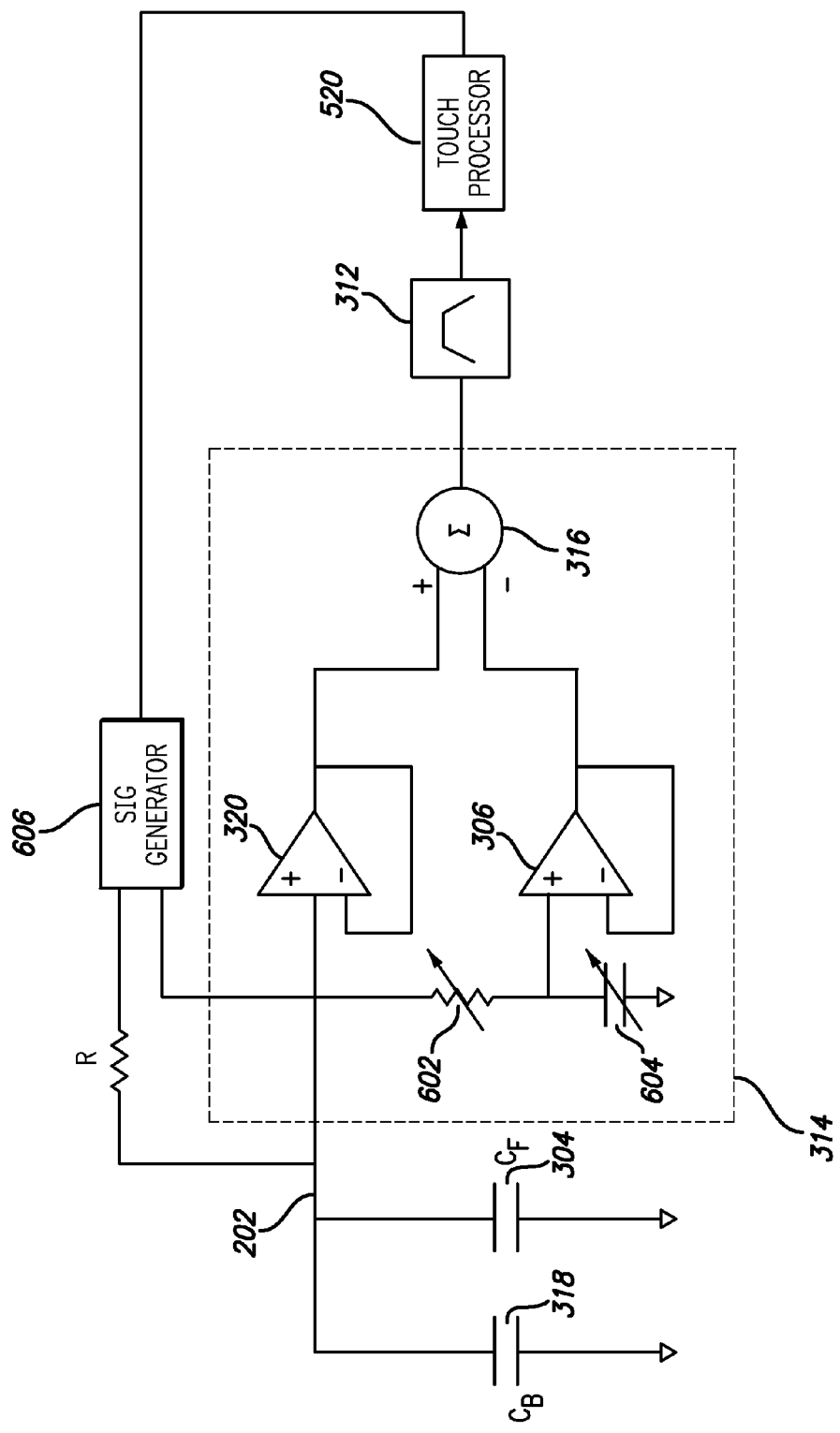
FIG. 6 illustrates another exemplary circuit to mitigate the effects of parasitic capacitance according to disclosed examples.

FIG. 6 illustrates another exemplary circuit to mitigate the effects of parasitic capacitance according to disclosed examples. In this example, in order to obtain a Vout of zero when no touch or proximity event is detected, Vstim and Istim can be held constant by signal generator 606, while a resistor 602 and a capacitor 604, which are coupled to the non-inverting input of operation amplifier 306, are adjusted in order to drive the outputs of operation amplifier 320 and 306 to be equal, thus driving Vout to be zero. One skilled in the art will recognize that current generator Istim can be replaced by a voltage generator and use the same calibration procedure in order to drive Vout to be zero. Resistor 602 and capacitor 604 can form an RC filter on the input of operation amplifier 306. During the calibration procedure, the RC filter can be adjusted by adjusting resistor 602 and capacitor 604 so that the sensing frequency we of equation 2 is slightly higher than the pass band of the RC filter. By tuning the RC filter in this manner, changes in self-capacitance caused by a touch or proximity event can cause amplitude modulation on the excitation signal.

Figure 7:
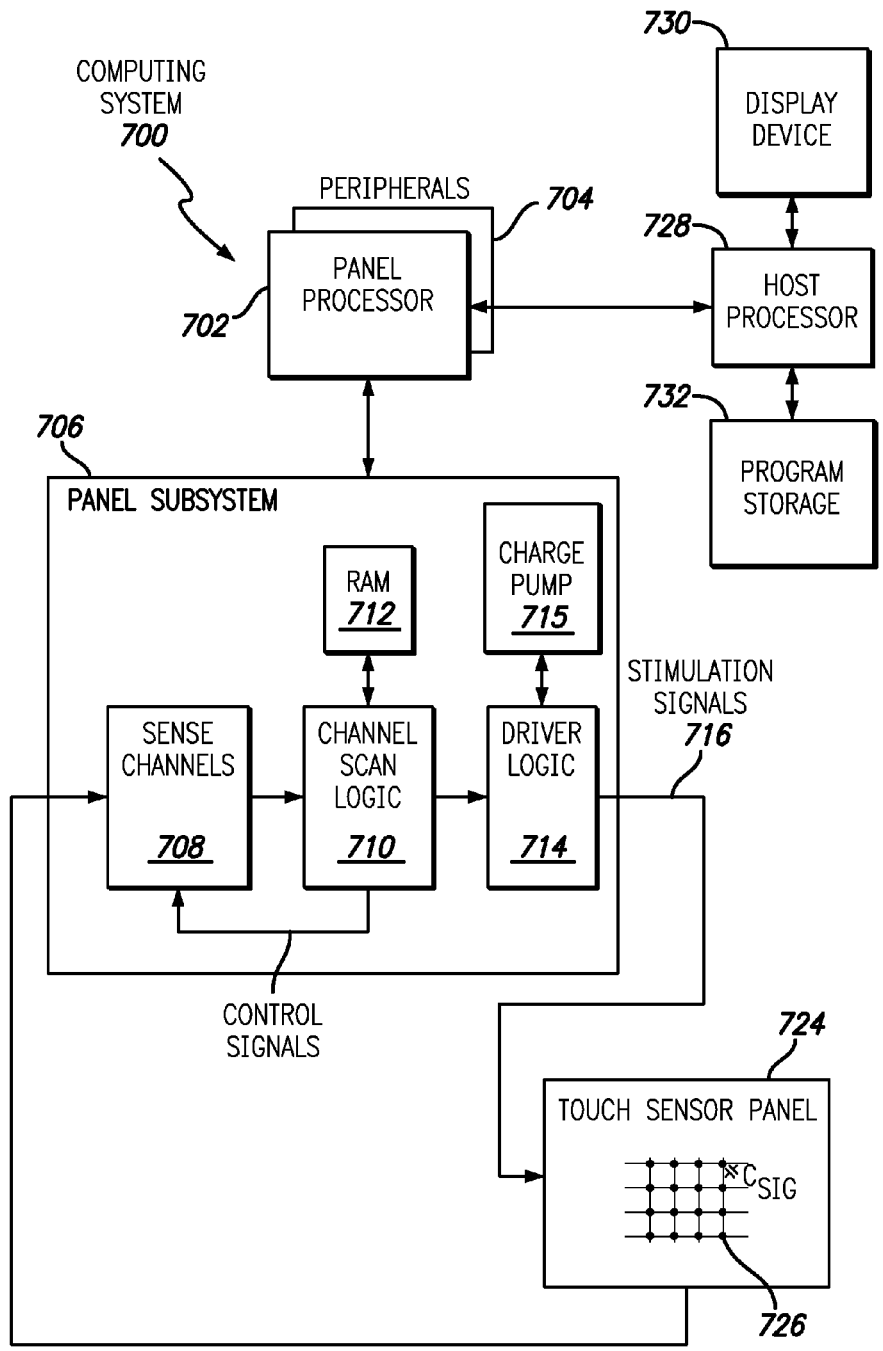
FIG. 7 illustrates an exemplary computing system including a touch sensor panel utilizing touch sensor common mode noise recovery according to one disclosed example.

FIG. 7 illustrates exemplary computing system 700 that can include one or more of the examples described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708 which can utilize operational amplifiers that can be configured to minimize saturation time, channel scan logic 710 and driver logic 714. Channel scan logic 710 can access RAM 712, autonomously read data from the sense channels and provide control for the sense channels including calibrating the sense channels for changes in phase correlated with a parasitic capacitance. In addition, channel scan logic 710 can control driver logic 714 to generate stimulation signals 716 at various frequencies and phases that can be selectively applied to drive lines of touch sensor panel 724. In some examples, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Each intersection of drive and sense lines can represent a capacitive sensing node and can be viewed as picture element (node) 726, which can be particularly useful when touch sensor panel 724 is viewed as capturing an "image" of touch. Each sense line of touch sensor panel 724 can drive sense channel 708 (also referred to herein as an event detection and demodulation circuit) in panel subsystem 706. The drive and sense lines can also be configured to act as individual electrodes in a self-capacitance touch sensing configuration.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 404 such as an LCD display for providing a UI to a user of the device. Display device 404 together with touch sensor panel 724, when located partially or entirely under the touch sensor panel, can form touch screen 718.

Note that one or more of the functions described above can be performed by firmware stored in memory (e.g. one of the peripherals 704 in FIG. 7) and executed by panel processor 702, or stored in program storage 732 and executed by host processor 728. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
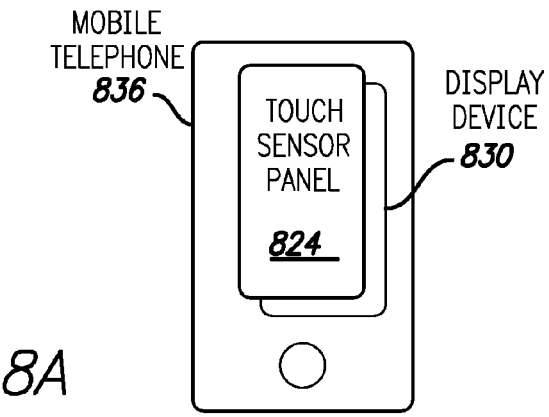
FIG. 8a illustrates an exemplary mobile telephone having a touch sensor panel that includes a touch common mode noise recovery circuit and method according to one disclosed example.

FIG. 8a illustrates exemplary mobile telephone 836 that can include touch sensor panel 824 and display device 830, the touch sensor panel including circuitry to mitigate the effects of parasitic capacitance on a self-capacitance touch detection device.

Figure 8B:
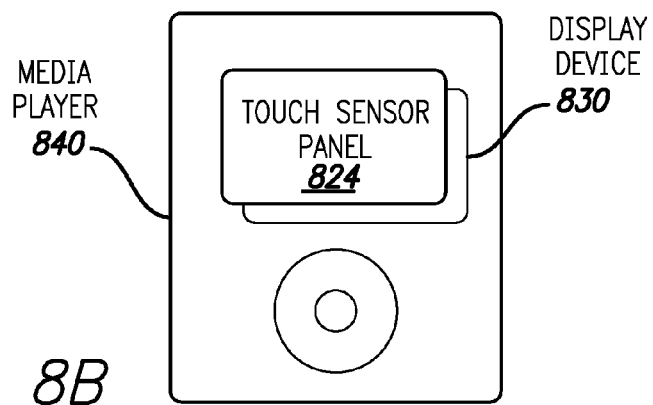
FIG. 8b illustrates an exemplary digital media player having a touch sensor panel that includes a touch common mode noise recovery circuit and method according to one disclosed example.

FIG. 8b illustrates exemplary digital media player 840 that can include touch sensor panel 824 and display device 830, the touch sensor panel including circuitry to mitigate the effects of parasitic capacitance on a self-capacitance touch detection device.

Figure 8C:
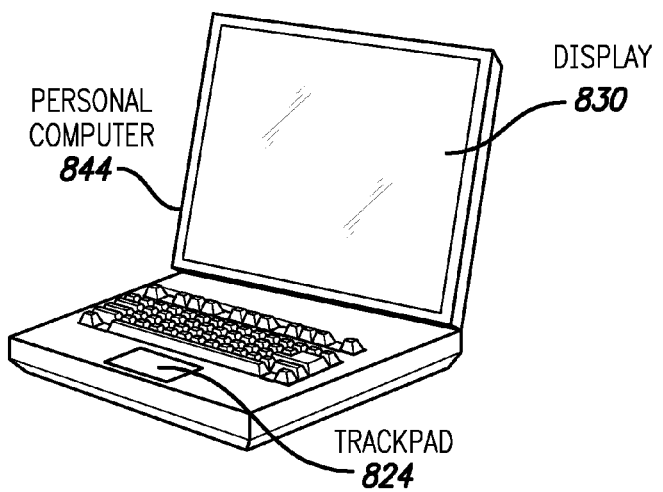
FIG. 8c illustrates an exemplary personal computer having a touch sensor panel that includes a touch common mode noise recovery circuit and method according to one disclosed example.

FIG. 8c illustrates exemplary personal computer 844 that can include touch sensor panel (trackpad) 824 and display 830, the touch sensor panel and/or display of the personal computer (in examples where the display is part of a touch screen) including circuitry to mitigate the effects of parasitic capacitance on a self-capacitance touch detection device. The mobile telephone, media player and personal computer of FIGS. 8a, 8b and 8c can achieve a wider dynamic range of sensing capabilities by switching its configuration to detect near field and far field events, and mitigating parasitic capacitance.

Although FIGS. 8a-c discuss a mobile telephone, a media player and a personal computer respectively, the disclosure is not so restricted and the touch sensor panel can be included on a tablet computer, a television, or any other device which utilizes the touch sensor panel including circuitry to switch between near field far field sensing configurations and mitigate the effects of parasitic capacitance on the touch sensor panel.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A system for detecting changes in self-capacitance indicative of a touch or proximity event on or near a touch electrode, the system comprising:
    a first circuit configured to receive a first stimulation signal and supply a first output signal in response to the first stimulation signal;
    a touch electrode configured to experience a change in self-capacitance in response to the touch or proximity event;
    a second circuit configured to receive both a signal indicative of the change in self-capacitance from the touch electrode and a second stimulation signal, and supply a second output signal in response to the signal indicative of the change in self-capacitance from the touch electrode and the second stimulation signal; and
    a processor capable of adjusting the second stimulation signal when no touch or proximity event is detected on the touch electrode such that the first output signal and the second output signal are substantially identical.

2. The system of claim 1, wherein the processor is further capable of measuring a difference between the first output signal and the second output signal created by the touch or proximity event occurring on the touch electrode.

3. The system of claim 1, wherein the second stimulation signal is a voltage and wherein the processor is capable of adjusting the voltage of the second stimulation signal when no touch or proximity event is detected on the touch electrode, such that the first output signal and the second output signal are substantially identical, and then maintaining the adjusted voltage of second stimulation signal during touch or proximity event detection.

4. The system of claim 1, wherein the second stimulation signal is a current and wherein the processor is capable of adjusting the current of the second stimulation signal when no touch or proximity event is detected on the touch electrode, such that the first output signal and the second output signal are substantially identical, and then maintaining the adjusted current of second stimulation signal during touch or proximity event detection.

5. A touch sensor panel that includes a plurality of touch electrodes, each touch electrode of the plurality of touch electrodes incorporating the system of claim 1.

6. The system of claim 1, wherein the processor determines that no touch or proximity event is detected on the touch electrode based on a difference between the first output signal and the second output signal, the difference detected by the processor, and adjusts the second stimulation signal in response to the determination.

7. The system of claim 1, wherein the first circuit comprises a first amplifier configured to receive the first stimulation signal and supply the first output signal and the second circuit comprises a second amplifier configured to receive the signal indicative of the change in self-capacitance and the second stimulation signal and supply the second output signal.

8. The system of claim 1, wherein the first stimulation signal is a first type of signal, and the second stimulation signal is a second type of signal, different from the first type of signal.

9. The system of claim 8, wherein the first stimulation signal is a voltage signal and the second stimulation signal is a current signal.

10. A method for detecting a touch or proximity event on a touch electrode, the method comprising:
    stimulating a touch electrode such that a self-capacitance of the touch electrode changes in response to the touch or proximity event occurring on or near the touch electrode;
    receiving a first stimulation signal at a first circuit, and generating a first output signal from the first circuit in response to the first stimulation signal;
    receiving a second stimulation signal and a signal indicative of the self-capacitance of the touch electrode at a second circuit, and generating a second output from the second circuit in response to the second stimulation signal and the signal indicative of the self-capacitance of the touch electrode; and
    adjusting the second stimulation signal when no touch or proximity event is occurring on the touch electrode such that the first output signal and the second output signal are substantially identical.

11. The method of claim 10, wherein the method further comprises measuring a difference between the first output signal and the second output signals created by the touch or proximity event occurring on the touch electrode.

12. The method of claim 10, wherein the second stimulation signal is a voltage and wherein adjusting the second stimulation signal when no touch or proximity event is occurring on the touch electrode includes adjusting the voltage of the second stimulation signal.

13. The method of claim 10, wherein the second stimulation signal is a current and wherein adjusting the second stimulation signal when no touch or proximity event is occurring on the panel includes adjusting the current of the second stimulation signal.

14. The method of claim 10, wherein adjusting the second stimulation signal is in response to a determination that no touch or proximity event is detected on the touch electrode based on a difference between the first output signal and the second output signal.

15. The method of claim 10, wherein the first circuit comprises a first amplifier configured to receive the first stimulation signal and supply the first output signal and the second circuit comprises a second amplifier configured to receive the signal indicative of the change in self-capacitance and the second stimulation signal and supply the second output signal.

16. The method of claim 10, wherein the first stimulation signal is a first type of signal, and the second stimulation signal is a second type of signal, different from the first type of signal.

17. The method of claim 16, wherein the first stimulation signal is a voltage signal and the second stimulation signal is a current signal.

18. A non-transitory computer readable storage medium having stored thereon a set of instructions for detecting a change in self-capacitance of a touch electrode in a touch sensor panel that when executed by a processor causes the processor to:
stimulate a touch electrode such that a self-capacitance of the touch electrode changes in response to a touch or proximity event occurring on or near the touch electrode;
receive a first stimulation signal at a first circuit, and generate a first output signal from the first circuit in response to the first stimulation signal;
receive a second stimulation signal and a signal indicative of the self-capacitance of the touch electrode at a second circuit, and generate a second output from the second circuit in response to the second stimulation signal and the signal indicative of the self-capacitance of the touch electrode; and
adjust the second stimulation signal when no touch or proximity event is occurring on or near the touch electrode such that the first output signal and the second output signal are substantially identical.

19. The non-transitory computer readable storage medium of claim 18, that further causes the processor to measure a difference between the first output signal and the second output signal created by the touch or proximity event occurring on the touch electrode.

20. The non-transitory computer readable storage medium of claim 18, wherein the second stimulation signal is a voltage and wherein the processor further adjusts the voltage of the second stimulation signal when no touch or proximity event is occurring on the touch electrode.

21. The non-transitory computer readable storage medium of claim 18, wherein the second stimulation signal is a current and wherein the processor further adjusts the current of the second stimulation signal when no touch or proximity event is occurring on or near the touch electrode.

22. The non-transitory computer readable storage medium of claim 18, wherein the processor determines that no touch or proximity event is detected on the touch electrode based on a difference between the first output signal and the second output signal, the difference detected by the processor, and adjusts the second stimulation signal in response to the determination.

23. The non-transitory computer readable storage medium of claim 18, wherein the first circuit comprises a first amplifier configured to receive the first stimulation signal and supply the first output signal and the second circuit comprises a second amplifier configured to receive the signal indicative of the change in self-capacitance and the second stimulation signal and supply the second output signal.

24. The non-transitory computer readable storage medium of claim 18, wherein the first stimulation signal is a first type of signal and the second stimulation signal is a second type of signal, different from the first type of signal.

25. The non-transitory computer readable storage medium of claim 24, wherein the first stimulation signal is a voltage signal and the second stimulation signal is a current signal.

* * * * *